UNITED STATES PATENT OFFICE.

CHARLES SIMMONS LAWRENCE, OF PLAINFIELD, WISCONSIN, ASSIGNOR OF ONE-HALF TO FRANK McCONICK, OF FRIENDSHIP, WISCONSIN.

WOOD-PRESERVING COMPOUND.

SPECIFICATION forming part of Letters Patent No. 682,363, dated September 10, 1901.

Application filed February 12, 1901. Serial No. 47,010. (No specimens.)

*To all whom it may concern:*

Be it known that I, CHARLES SIMMONS LAWRENCE, a citizen of the United States, residing at Plainfield, in the county of Waushara and State of Wisconsin, have invented certain new and useful Improvements in Wood-Preserving Compounds; and I do hereby declare the following to be a full, clear, and exact description of the invention, such as will enable others skilled in the art to which it appertains to make and use the same.

The object is in a simple, efficient, and thoroughly-practical manner to kyanize wood.

The invention consists in a composition of matter for preserving or kyanizing wood, as will be hereinafter fully described and claimed.

In carrying my invention into effect I take of the following substances, by weight: chlorid of sodium, sixteen parts; arsenious acid, eight parts; bichlorid of mercury, one part; nitrate of potassium, two parts; subacetate of copper, one part. These substances are thoroughly mixed and by preference are applied in the following manner: The piece of timber to be treated is perforated partly through from one or all sides with any number of holes forming pockets, into which is placed the compound in quantity partly or nearly to fill the pockets, and these are then securely plugged and sealed in such manner as to render them air-tight. In the case of telegraph-poles, telephone-poles, fence-posts, or other timbers to be set upright in the ground that portion of the post or timber to be buried, and also its top, may be treated in the manner described, while in the case of railway-ties, bridge-timbers, and other timbers to occupy in use a horizontal or approximately horizontal position the entire length of such timbers may be treated. In any case the timber absorbs the compound and is thus rendered impervious to deterioration or decay.

It is to be understood that I do not limit myself to the exact proportions of the ingredients herein given, as the same may be varied without departing from the spirit of my invention.

Having thus fully described my invention, what I claim as new, and desire to secure by Letters Patent, is—

1. A composition of matter for preserving wood, consisting of chlorid of sodium, arsenious acid, bichlorid of mercury, nitrate of potassium, and subacetate of copper, in about the proportions specified.

2. A composition of matter for preserving wood, consisting of the following ingredients, by weight: chlorid of sodium, sixteen (16) parts; arsenious acid, eight (8) parts; bichlorid of mercury, one (1) part; nitrate of potassium, two (2) parts; and subacetate of copper, one (1) part, substantially as described.

In testimony whereof I affix my signature in the presence of two subscribing witnesses.

CHARLES SIMMONS LAWRENCE.

Witnesses:
S. A. CUMING,
D. H. SCOFIELD.